(12) United States Patent
Sheppard et al.

(10) Patent No.: US 11,727,416 B2
(45) Date of Patent: Aug. 15, 2023

(54) METHODS AND APPARATUS TO ESTIMATE LARGE SCALE AUDIENCE DEDUPLICATION

(71) Applicant: The Nielsen Company (US), LLC, New York, NY (US)

(72) Inventors: Michael R. Sheppard, Holland, MI (US); Damien Forthomme, Seattle, WA (US); Molly Poppie, Arlington Heights, IL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 86 days.

(21) Appl. No.: 16/698,898

(22) Filed: Nov. 27, 2019

(65) Prior Publication Data

US 2021/0158377 A1    May 27, 2021

(51) Int. Cl.
| | |
|---|---|
| *G06Q 10/06* | (2023.01) |
| *G06Q 10/10* | (2023.01) |
| *G06Q 30/02* | (2023.01) |
| *G06Q 30/0201* | (2023.01) |
| *G06F 16/22* | (2019.01) |
| *G06F 16/2455* | (2019.01) |
| *G06F 16/215* | (2019.01) |
| *H04N 21/81* | (2011.01) |
| *H04N 21/442* | (2011.01) |

(52) U.S. Cl.
CPC ....... *G06Q 30/0201* (2013.01); *G06F 16/215* (2019.01); *G06F 16/2246* (2019.01); *G06F 16/24558* (2019.01); *H04N 21/44213* (2013.01); *H04N 21/812* (2013.01)

(58) Field of Classification Search
CPC ......... G06Q 10/06; G06Q 10/10; G06Q 30/02
USPC ....................................................... 705/7.29
See application file for complete search history.

(56) References Cited

U.S. PATENT DOCUMENTS

| | | | |
|---|---|---|---|
| 5,867,416 | A | 2/1999 | Feldmann et al. |
| 8,149,162 | B1 | 4/2012 | Pauls |
| 8,321,556 | B1 | 11/2012 | Chatterjee et al. |
| 8,370,489 | B2 | 2/2013 | Mazumdar et al. |

(Continued)

OTHER PUBLICATIONS

Waziri et al., "A New Newton's Method with Diagonal Jacobian Approximation for Systems of Nonlinear Equations," Journal of Mathematics and Statistics 6 (3), 246-252, 2010, 7 pages.

*Primary Examiner* — Nga B Nguyen
(74) *Attorney, Agent, or Firm* — Hanley, Flight and Zimmerman, LLC

(57) ABSTRACT

An example apparatus includes an association controller to generate a tree structure association for a total audience size that accessed a plurality of media items, the tree structure association including a first node representative of a first media item accessed by first audience members of the total audience size and a second node representative of a second media item accessed by second audience members of the total audience size, a matrix generator to generate a matrix by selecting a sum of probabilities value corresponding to the tree structure association, the sum of probabilities value representative of a probability of the first audience members accessing the first media item and storing the sum of probabilities value in an element of the matrix, and a commercial solver to estimate a deduplicated audience size of the total audience size using the matrix.

28 Claims, 7 Drawing Sheets

(56) References Cited

U.S. PATENT DOCUMENTS

| | | | |
|---|---|---|---|
| 9,092,797 B2* | 7/2015 | Perez | G06Q 10/067 |
| 9,203,642 B2 | 12/2015 | Chatterjee et al. | |
| 9,936,255 B2 | 4/2018 | Sheppard et al. | |
| 2017/0004526 A1 | 1/2017 | Morovati et al. | |
| 2017/0011420 A1* | 1/2017 | Sullivan | G06N 20/00 |
| 2017/0091656 A1 | 3/2017 | Sheppard et al. | |
| 2017/0155956 A1 | 6/2017 | Nagaraja Rao et al. | |
| 2018/0114139 A1* | 4/2018 | Kucera | G06Q 30/0269 |
| 2018/0324476 A1* | 11/2018 | Zhu | H04N 21/25891 |
| 2018/0324489 A1* | 11/2018 | Yu | H04N 21/2407 |

* cited by examiner

| Union/Margin | Probability |
|---|---|
| UE=100 | 1 |
| A | 0.1 |
| B | 0.2 |
| C | 0.3 |
| (AB) | 0.27 |
| (ABC) | 0.40 |

METHODS AND APPARATUS TO ESTIMATE LARGE SCALE AUDIENCE DEDUPLICATION

FIELD OF THE DISCLOSURE

This disclosure relates generally to monitoring computer-based media delivery, and, more particularly, to methods and apparatus to estimate large scale audience deduplication.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time. In some examples, the audience measurement entity obtains (e.g., directly, or indirectly from a media service provider) return path data (e.g., census data representative of a population of users) from media presentation devices (e.g., set-top boxes) that identifies tuning data from the media presentation devices. In such examples, because the return path data may not be associated with a known panelist, the audience measurement entity models and/or assigns viewers to represent the return path data. Additionally, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

BRIEF DESCRIPTION OF THE DRAWINGS

In general, the same reference numbers will be used throughout the drawing(s) and accompanying written description to refer to the same or like parts.

Figure 1:
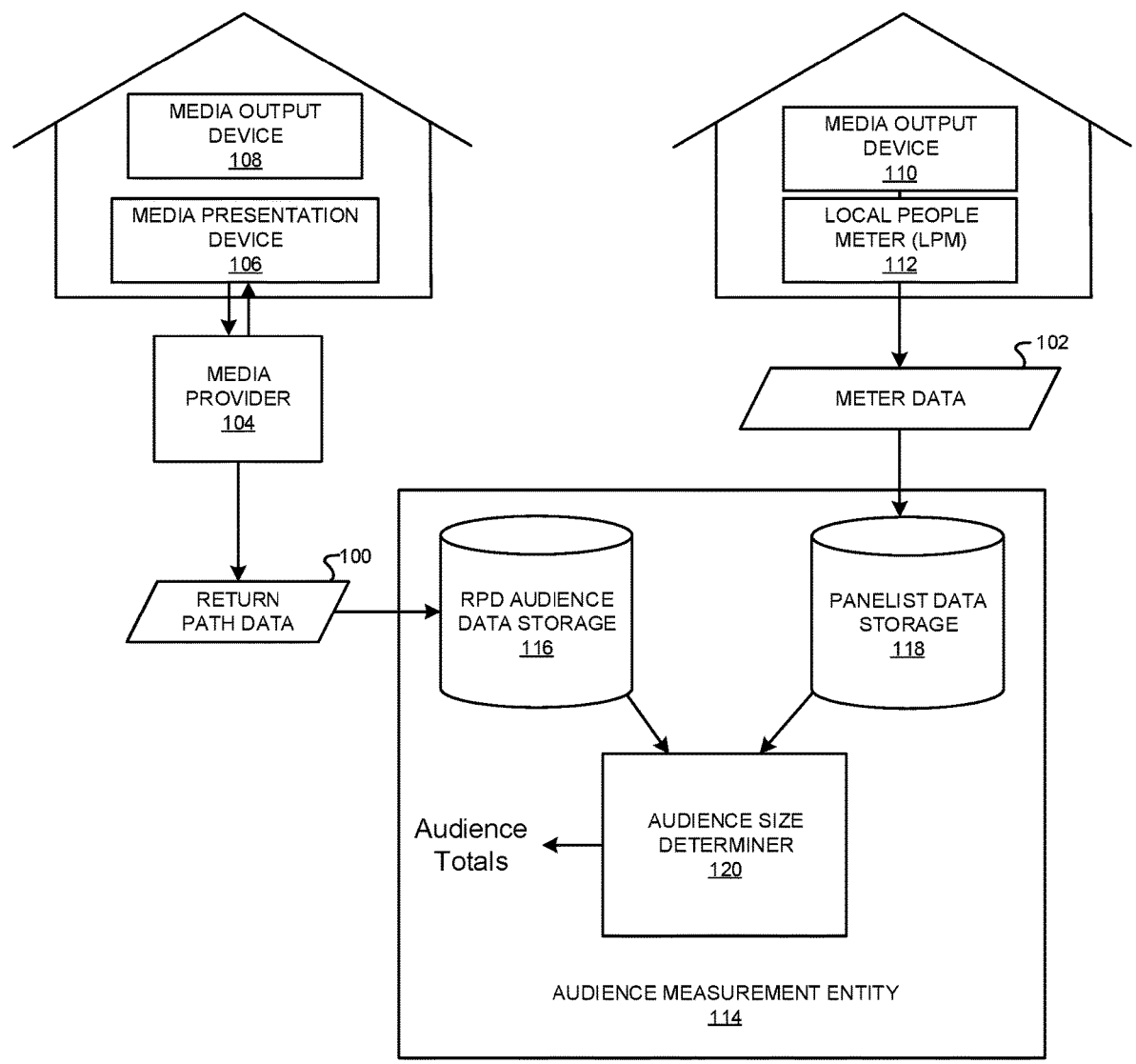
FIG. 1 is a block diagram of an example environment in which return path data and meter data are collected from media presentation locations and are analyzed by an example audience measurement entity to estimate unknown total audience sizes.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Audience measurement entities seek to understand the composition and audience size of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether an audience member is present (e.g., media output by a media output device at which no audience is present, media exposure to an audience member(s), etc.).

A media presentation device (e.g., a STB) provided by a service provider (e.g., a cable television service provider, a satellite television service provider, an over-the-top (OTT) service provider, a music service provider, a movie service provider, a streaming media provider, etc.) or purchased by a consumer may contain processing capabilities to monitor, store, and/or transmit tuning data (e.g., which television channels are tuned by the media presentation device at a particular time) back to the service provider. The service provider can then aggregate and provide such return path data to an audience measurement entity (e.g., The Nielsen Company (US), LLC) to analyze media presentation activity and/or generate audience metrics. Data transmitted from a media presentation device back to the service provider is referred to herein as return path data which may include census data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc. However, census data may be derived or extracted from return path data. Census data is indicative of the total percentage of a population of users (e.g., based on the return path data) that was exposed to media at a particular margin. For example, if 20% of a population was exposed to a first margin (e.g., a first a television show), the census data may be indicative of the 20% exposure.

To determine aspects of media presentation data (e.g., which household member is currently consuming a particular media and the demographics of that household member), market researchers may perform audience measurements by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. In this manner, audience measurement data includes demographic impressions which are generated by logging impressions in association with demographic information of panelists. An LPM in communication with an audience measurement entity communicates audience measurement data (e.g., metering data) to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but is not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, a selected stream, an address for media (e.g., a network address), and/or any other identifier for a source and/or carrier of media.

In other examples, examples disclosed herein can be implemented with census-level impression data logged by an AME and panel impression data. The impression data is logged using internet media monitoring techniques including those disclosed in U.S. Pat. No. 8,370,489 to Mazumdar et al., and entitled "Methods and apparatus to determine impressions using distributed demographic information," which is hereby incorporated herein by reference in its entirety. In such examples, census data corresponds to impressions (e.g., exposures to a media item by an audience member) logged for a general audience in a population regardless of whether the impressions correspond to audience members that are identifiable by the AME. In such examples, census-level impressions are collected as anonymous impression data. Panel impression data is logged by the AME from panelist enrolled in the panel that agreed to having their media access activities monitored for audience analysis. In this manner, the AME uses its panel data to generate demographic impression data. In other examples, instead of using panel data of the AME, demographic impression data can be generated by a third-party database proprietor that monitors media accesses and logs corresponding impressions in association with demographic data collected from its subscribers.

To overcome such inconsistencies, examples disclosed herein estimate deduplicated audience sizes based on margins and unions. As used herein, a margin is a subpart of media, and marginal data is data related to margins of media. For example, if the media corresponds to an advertisement, the margins may be different websites (e.g., different media items) that include the advertisement. In another example, a first media item (e.g., a first television show) may correspond to a first margin and a second media item (e.g., a second television show different than the first media) may correspond to a second margin. In yet another example, if the media corresponds to a one-hour program, the margins may be four 15-minute increments of the one-hour program. As used herein, a union is data corresponding to a combination of margins. In some examples, a union can be made up of smaller unions (e.g., a union of smaller unions of margins, such as a union of smaller unions of time-periods) and/or individual margins (e.g., time-periods, such as quarter-hours). For example, a first union may include a first television show and a second television show, a second union may include third, fourth, and fifth television shows, and a third union may include the first union and the second union. As used herein, child unions or children are the smaller unions that make up a larger union, and a parent union or a parent is a larger union that includes the child union(s) and/or children. Using the above example, the children of the first union include the first television show and the second television show, and the parent of the first union is the third union. As used herein, reach is a cumulative percentage or total of a population that has been counted as an audience member (e.g., a viewer, a listener, a reader, an observer, etc.) of the media at least once during a specified time interval (e.g., hourly, daily, weekly, monthly, etc.).

In some examples, an audience measurement entity receives marginal media exposure data (e.g., different episodes of a television series, different network channels, different quarter-hour time slots of a television program, a radio program, etc.) for different unions of marginal data and/or smaller unions of audience members (e.g., total audience, panel audience, etc.) and estimates a total population reach (e.g., a total number of deduplicated users that were exposed to media) across all of the different unions. However, in some examples, the deduplicated audience size for one or more margins and/or one or more combinations of margins may be unknown and/or otherwise missing. Examples disclosed herein estimate one or more deduplicated audience sizes of media given partial information of the relationships to the received known audience size data.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

To estimate the deduplicated audience sizes of media given partial information from the audience, examples disclosed herein utilize a tree graph association or tree structure association for the margins and union(s). The tree graph association corresponds to the structure of the margins and/or unions where each margin and each union corresponds to a node. Examples disclosed herein tag each node (e.g., store an identifier in association with) as a descendant (e.g., a child, a grandchild, etc.) and/or an ancestor (e.g., a parent, a grandparent, etc.) depending on the structure of the unions corresponding to stored panel data. For example, if panel data includes a unique audience number or percentage corresponding to three margins (e.g., A, B, and C), and the panel data further includes a unique audience number or percentage corresponding to a first union (e.g., AB) and a second union (e.g., ABC), examples disclosed herein may tag (1) nodes A and B as having parent AB and grandparent ABC, (2) node C as having parent ABC, (3) node AB as having children A and B and parent ABC, and (4) node ABC as having children AB and C and grandchildren A and B. Additionally, examples disclosed herein may tag the margin nodes (e.g., A, B, and C) as leaves, and tag ABCD as a root. As used herein, a leaf is a node that does not have children (e.g., a terminal node) and a root is a node that has no parents.

Traditional methods to estimate deduplicated audience sizes can do so by solving a maximum entropy problem. Accordingly, traditional methods may solve Equation 1 and Equation 2, below.

$$\text{maximize}_p H = -\Sigma_{i=1}^n (p_i \log(p_i)) \qquad \text{Equation 1}$$

$$\text{subject to } \Sigma_{i=1}^n (c_{ji} p_i) = d_j = 0, \ldots, m \qquad \text{Equation 2}$$

In Equation 1 above, a matrix p corresponds to the probabilities that identify a distribution of total people that are exposed to media (e.g., exposed to a margin, exposed to a union, viewed a television show, etc.), the variable n corresponds to the number of probabilities, the variables j and i index constraints c in a constraint matrix $c_{ji}$, and the variable m corresponds to the audience demographic information known from the constraints c. Example constraints c specify the numerical limits for use in modeling the audience sizes and exposures to various media. In examples disclosed herein, constraints correspond to limits in audience sizes associated with various media. For example, a first margin corresponding to a first television show may be associated with a first constraint of 0.1. In such an example, the constraint, 0.1, identifies a limit of ten percent of an audience size exposed to the first margin.

In Equation 2 above, a matrix c represents the constraints of the system, a matrix d represents the constraint limits. In Equation 1 or Equation 2 above, the coefficients of the matrix c can be either zero or one for any index of "i" or "j". Equation 3 below illustrates this concept.

$$c_{ji} = \{0,1\} \forall \{j,i\} \qquad \text{Equation 3}$$

When optimizing Equation 1, in view of Equation 2 and Equation 3, the probabilities can be enumerated as illustrated below, in Equation 4.

$$p_i = \exp(\Sigma_{j=1}^m (c_{ij} \lambda_j)) \qquad \text{Equation 4}$$

In Equation 4, the variable λ corresponds to a Lagrange multiplier, which is initialized to zero. In some applications, commercial solvers are utilized to solve for the Lagrange multipliers, λ. Alternatively, some applications utilize the Jacobian matrix as in input to commercial solvers to improve processing efficiency when solving for and/or otherwise identifying the Lagrange multipliers, λ. Equation 5 below can be used to solve for the Lagrange multipliers, λ, while satisfying the constraints, c.

$$f_j(\lambda) = \Sigma_{i=1}^n (c_{ij} p_i) = \Sigma_{i=1}^n (c_{ij} \exp(\Sigma_{j=1}^m (c_{ij} \lambda_j))) \qquad \text{Equation 5}$$

In Equation 5 above, the variable f corresponds to a sum of probabilities associated with each "jth" index. For example, each node in a tree structure association (e.g., each margin and/or union) may be associated with an index value. In examples disclosed herein, a sum of probabilities, f, may be identified with an index value corresponding to the associated node being analyzed. For example, if a first node (e.g., a first margin) is tagged with an index value of one, the corresponding sum of probabilities may be enumerated as $f_1$. Further, the Lagrange multipliers, λ, can be solved such that the Equation 6 below is satisfied.

$$f_j(\lambda) = d_j = 0, \ldots, m \qquad \text{Equation 6}$$

In Equation 6 above, the variable d corresponds to known probabilities obtained via panelist data. The known probabilities are probabilities that an audience member and/or audience size accessed media known to be true. These are known probabilities because they are based on audience measurement data for which identities of audiences and corresponding assessed media are known. In an alternate example, the sum of probabilities, f, may be defined in a manner similar to Equation 7, below.

$$F_j(\lambda) = f_j - d_j \qquad \text{Equation 7}$$

Accordingly, such a solution can be solved using Newton's Method for solving systems of non-linear equations. Newton's method for solving a system of non-linear equations is illustrated in Equation 8, below.

$$J_F(\lambda_n)(\lambda_{n+1} - \lambda_n) = -F(\lambda_n) \qquad \text{Equation 8}$$

In Equation 8 above, the variable n corresponds to the "nth" index value, the variable λ corresponds to the vector of individual Lagrange multipliers associated with a jth index $\{\lambda\}_j$, and the matrix J corresponds to the Jacobian matrix. The Jacobian matrix, J, is calculated to substantially reduce or eliminate error in audience size measurements. The Jacobian matrix, J, is a matrix representative of the amount of transformation performed to audience data.

The Jacobian matrix, J, can be defined as a partial derivative of a sum of the probabilities, f, with respect to a partial derivative of the Lagrange multipliers, λ. The Jacobian matrix, J, is illustrated below in Equation 9.

$$J_{jk} = \frac{\partial f_j}{\partial \lambda_k}$$ Equation 9

In Equation 9 above, the sum of probabilities, f, can be expanded utilizing Equation 6, as shown in Equation 10 below.

$$J_{jk} = \frac{\partial}{\partial \lambda_k} \sum_{i=1}^{n} (c_{ij}p_i) = \frac{\partial}{\partial \lambda_k} \sum_{i=1}^{n} \left(c_{ij}\left(\exp\left(\sum_{j=1}^{m} (c_{ij}\lambda_j)\right)\right)\right)$$ Equation 10

Furthermore, Equation 10 can be rewritten as shown below in Equation 11.

$$J_{jk} = \sum_{i=1}^{n} \frac{\partial}{\partial \lambda_k} \left(\exp\left(\sum_{j=1}^{m} (c_{ij}\lambda_j)\right)\right)$$ Equation 11

Equation 11 can be rewritten as shown below in Equation 12, and further in Equation 13.

$$J_{jk} = \Sigma_{i=1}^{n} c_{ji} c_{ki} (\exp(\Sigma_{j=1}^{m} (c_{ij}\lambda_j)))$$ Equation 12

$$J_{jk} = \Sigma_{i=1}^{n} (c_{ji} c_{ki}) p_i$$ Equation 13

In examples disclosed herein, the Jacobian matrix, J, can be an input to one or more commercial solvers to reduce processing time relative to prior techniques when solving large-scale audience deduplication problems. Examples disclosed herein employ methods and apparatus to approximate the Jacobian matrix more efficiently than prior techniques by utilizing a sum of probabilities, or a function of a sum of probabilities, associated with margins and/or unions of media as elements in the Jacobian matrix.

Examples disclosed herein utilize methods and apparatus to determine diagonal elements in a Jacobian matrix (e.g., elements in which the row and column index are identical) based on a first sum of probabilities obtained from a tree graph association or tree structure association for the margins and union(s). For example, in a tree graph association or tree structure association, examples disclosed herein determine elements in a Jacobin matrix for descendant nodes (e.g., one or more child node(s) that is/are descendent(s) of one or more parent node(s)) using a second sum of probabilities. Additionally, examples disclosed herein can use a tree graph association or tree structure association to determine non-diagonal elements and non-descendant elements in a Jacobin matrix using a third sum of probabilities.

FIG. 1 is a block diagram of an environment in which example return path data 100 and example meter data 102 are collected to determine unknown total audience sizes based on known marginal and/or union totals. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example return path data (RPD) audience storage 116 (e.g., a database), an example panelist data storage 118 (e.g., a database), and an example audience size determiner 120. Although the example audience size determiner 120 of FIG. 1 is illustrated as determining deduplicated audiences size totals for margins and/or unions of return path data and/or panelist data, examples disclosed herein may be utilized with any type of data where audience size information is known for some margins and/or unions and unknown for other margins and/or unions (e.g., exposures to websites, purchasing products, store visits, etc.).

The example media provider 104 of FIG. 1 is a service provider (e.g., a cable media service provider, a radio frequency (RF) media provider, a satellite media service provider, etc.) that delivers media to be accessed by an audience member via the example media presentation device 106. The media provided by the example media provider 104 is transmitted (e.g., via a wired and/or wireless network connection) to the media presentation device 106. The media presentation device 106 is connected, via a wired and/or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is operating to access media, the media presentation device 106 receives media corresponding to a station, a program, a website, etc., based on the tuning of the example media presentation device 106. For example, the media presentation device 106 may be a set-top box. Additionally or alternatively, the example media presentation device 106 may be an over-the-top (OTT) device, a video game console, a digital video recorder (DVR), a digital versatile disc (DVD) player, a receiver, a router, a server, a computer, a mobile device, software executed by a website, computer, and/or application, and/or any device that receives media from a service provider. For example, the media presentation device 106 may be a website and/or application that provides media to users via the media output device 108. In some examples, the media presentation device 106 may implement a DVR and/or a DVD player. In some examples, the media presentation device 106 includes a unique serial number that, when associated with subscriber information, allows an audience measurement entity, a marketing entity, and/or any other entity to ascertain specific subscriber behavior information.

By way of example, the media presentation device 106 may be tuned to channel 5. In such an example, the media presentation device 106 outputs media (e.g., from the example media provider 104) corresponding to the tuned channel 5. The media presentation device 106 may gather tuning data corresponding to channels, stations, websites, etc., to which the example media presentation device 106 is tuned. The example media presentation device 106 generates and transmits the example return path data 100 (e.g., census data corresponding to the total population of users) to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114 for storing in the RPD audience storage 116. Additionally or alternatively, the example RPD audience storage 116 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data.

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists' exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable of presenting media to a user. The LPM 112 may be a portable people meter, a cell phone, a computing device, a sensor, and/or any other device capable of metering (e.g., monitoring) audience exposure to media. In some examples, a media presentation location (e.g., a household, a retail establishment, a commercial establishment, etc.) may include a group of LPMs 112. In such examples, the group of the LPMs 112 may be used to monitor media exposure for multiple audience members and/or media output devices 110. Additionally, the example panelist data storage 118 receives and stores the example meter data 102 from the example LPM 112.

In some examples, the example LPM 112 of FIG. 1 includes buttons assigned to audience members to determine which of the audience members is watching the example media output device 110. The LPM 112 may periodically prompt the audience members via LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, a 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet medium, a digital subscriber line (DSL), a telephone line, a coaxial cable, or any wireless connection, etc.

The example return path data audience storage 116 of the example AME 114 of FIG. 1 collects the example return path data 100 corresponding to the example media presentation device(s) 106. As described above, the example return path data 100 includes tuning data of the example media presentation device 106. However, in some examples, the example return path data 100 may not include specific data identifying any information relating to the audience of the example media output device 108. In such examples, another device and/or processor models such audience information prior to storing in the example return path data audience storage 116. For example, the device and/or processor may assign and/or model virtual users to augment the example return path data 100, thereby generating audience-assigned return path data.

The example audience size determiner 120 of FIG. 1 receives the recorded total audience sizes for different margins (e.g., media items such as a first television show, a second television show, a first website, a second website, etc.) and/or unions of different margins from the example panelist data storage 118, the total audience sizes for the population (e.g., based on census data) for the different margins (e.g., media items) of the media from the RPD audience data storage 116, and a total population size (e.g., the universe estimate) from one or more devices from either the RPD audience data storage 116, the panelist data storage 118, and/or any other storage. In examples disclosed herein, the audience size determiner 120 may implement an example means for determining.

Unions may be representative of any combination of media items (e.g., margins) which an audience member and/or a plurality of audience members may access (e.g., be exposed to). In some examples, a union may include multiple unions. For example, union ABCD (e.g., four different television channels) may be a union of union AB (e.g., a first television channel and a second television channel) and union CD (e.g., a third television channel and a fourth television channel), where union AB is a union of margin A and margin B, and union CD is a union of margin C and margin D. Each union may have corresponding descendants nodes and/or ancestor nodes. Using the above example, the parent of union AB is union ABCD, and the children of union AB are A and B. Each union corresponds to a union reach or total audience size.

Figures 2, 3:
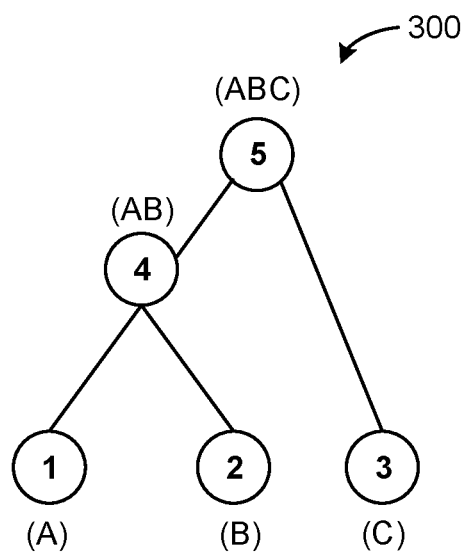
FIG. 2 illustrates example marginal and union total audience size data.
FIG. 3 illustrates an example tree structure depicting a tree structure association corresponding to margins and unions of the example marginal and union total audience size data of FIG. 2.

The example audience size determiner 120 of FIG. 2 generates a tree structure association by tagging each node (e.g., each margin or union) with the corresponding descendants and/or ancestors. For example, the audience size determiner 120 stores an index value in association with each node with index values corresponding to the corresponding descendants and/or ancestors in a record (e.g., in a register, storage, a database, memory, cache, etc.). Accordingly, each node corresponds to known or unknown total audience sizes in a tree structure association that corresponds to unions of margins for media. An example tree structure association in conjunction with known and unknown total audience sizes for media is further shown in conjunction with FIG. 2. The example audience size determiner 120 determines deduplicated audience member totals for all margins and/or unions of media. For example, when an audience member is exposed to a first television show (e.g., a first margin) and a second television show (e.g., a second margin), rather than duplicating a total audience member count, the audience size determiner 120 can estimate a total deduplicated audience size. In doing so, the audience size determiner is configured to solve a matrix (e.g., a Jacobian matrix) based on one or more sum(s) of probabilities associated with each node in the tree structure association. Once the matrix (e.g., a Jacobian matrix) is solved, the audience size determiner 120 can determine audience member totals for all margins and/or unions of media. The example audience size determiner 120 is further described below in conjunction with FIG. 4.

FIG. 2 includes example marginal and union total audience size data 200. The example marginal and union total audience size data 200 of FIG. 2 corresponds to the deduplicated total audience sizes of the panel, the population, or any other group of audience that was exposed to media at different margins and/or unions based on the return path data 100 stored in the example RPD audience data storage 116, the meter data 102 stored in the example panelist data storage 118, or other audience data stored in other storage. For example, the audience size determiner 120 obtains the marginal and union total audience size data 200 corresponding to total audience sizes with both known (e.g., the total audience sizes for margin A=10 people, B=20 people, and C=30 people and the total audience sizes for union (AB)=27 people and (ABC)=40 people).

For example, if A, B, and C represent different media items (e.g., margins), the marginal and union total audience size data 200 of FIG. 2 shows that ten people were exposed to the first media item (A), twenty people were exposed to the second media item (B), thirty people were exposed to the third media item (C), twenty-seven deduplicated people were exposed to both the first and second media items (D), and forty deduplicated people were exposed to the first, second, and third media items, where the universe estimates of people is one hundred.

FIG. 3 illustrates an example tree structure association 300 representing the tree structure of the margins and unions of the example marginal and union total audience size data 200 of FIG. 2. The tree structure association 300 corresponds to a tree linkage of margins and unions based on the unions identified in the example marginal and union total audience size data 200. Alternatively, other tree structures can be generated based on different combinations of margins and/or unions. The example audience size determiner 120 (FIG. 1) generates a tree structure association or tree structure associations corresponding to the example tree structure association 300 by tagging (e.g., associating index values) the margins and/or unions with corresponding node numbers, ancestors, and/or descendants. For example, the audience size determiner 120 may tag the AB union with a node number (e.g., 4) and may tag the AB node as having a parent union of ABC (e.g., node 5) and children margins A and B (e.g., nodes 1 and 2). In this manner, commercial solvers of the audience size determiner 120 can utilize the values of the example marginal and union total audience size data 200 for the corresponding variables of the above Equations 1-8. After the example audience size determiner 120 generates the tree structure association 300 based on the marginal and union total audience size data 200, the example audience size determiner 120 determines the total deduplicated audience sizes for the audience nodes (e.g., nodes 1, 2, 3, 4, and/or 5).

Figure 4:
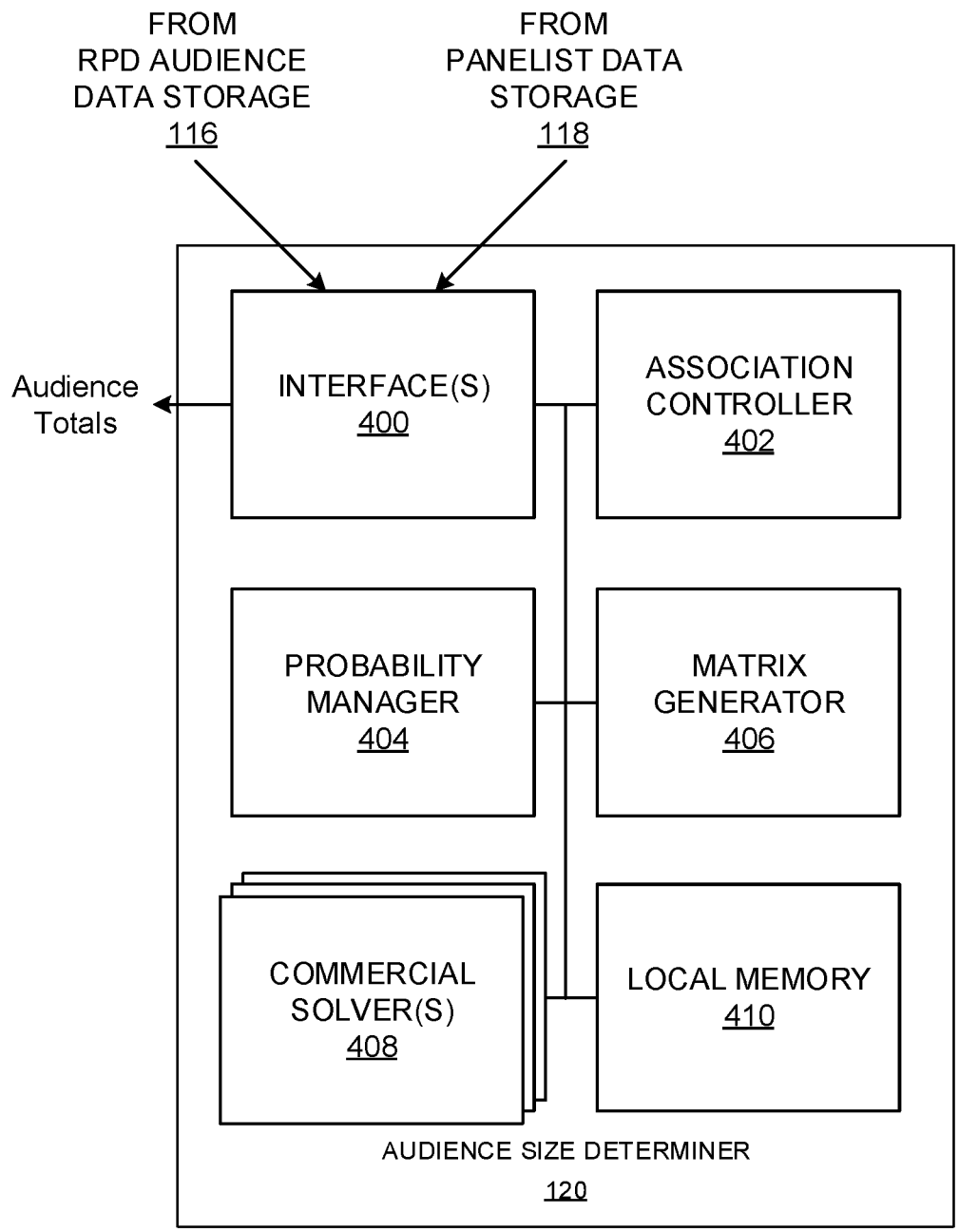
FIG. 4 is a block diagram of the example audience size determiner of FIG. 1 to determine total deduplicated audience sizes for margins and/or unions based on known total audience sizes.

FIG. 4 is a block diagram of the example audience size determiner 120 of FIG. 1 to determine (e.g., estimate) total deduplicated audience sizes for margins and/or unions based on known total audience sizes. As used herein, a known total audience size (e.g., total deduplicated audience size) corresponds to a number of audience members known to be exposed to at least one media item (e.g., a margin). In examples disclosed herein, each margin may be associated with a known total audience size when audience measurement data for a media item is generated by logging impressions based on known audience members that accessed that media item. Further, each union of margins may be associated with a known total audience size when audience measurement data for multiple media items is generated by logging impressions based on known audience members that accessed those multiple media items. The example audience size determiner 120 includes an example interface(s) 400, an example association controller 402, an example probability manager 404, an example matrix generator 406, an example commercial solver(s) 408, and an example local memory 410. Although the example audience size determiner 120 is described in conjunction with return path data or panelist data, the example audience size determiner 120 may estimate total audience sizes based on information provided by any device that measures accesses to subjects of interest in terms of different margins and/or unions. For example, the example audience size determiner 120 may determine (e.g., estimate) one or more total audience sizes from different programs, store visits for different stores, website visits, time intervals of media exposure, etc.

The example interface(s) 400 of FIG. 4 receives total audience sizes (e.g., panel total audience sizes, RPD total audience sizes, and/or any other total audience sizes) for margins and/or unions from a database (e.g., the RPD audience data storage 116, the panelist data storage 118, or another storage). The margins may be separated based on media item. For example, the total audience sizes may correspond to four margins each associated with a different media item. Additionally, the interface(s) 400 obtains a universe estimate (UE) corresponding to the universe of users/viewers/listeners. The universe is representative of all the audience members being measured. Further, the universe is representative of the total number of people or population available to access the media item(s) under analysis regardless of whether such persons actually accessed the media items(s) under analysis. The UE values may be derived from prior audience size measurements. Additionally, the example interface(s) 400 may output total audience sizes that have been calculated by the commercial solver(s) 408. In some examples, the interface(s) 400 transmit the total audience sizes back to the RPD audience data storage 116 or the panelist data storage 118 to add the estimated total audience sizes to the dataset to eliminate the unknown total audience sizes. In examples disclosed herein, the interface(s) 400 may implement example means for interfacing.

The example association controller 402 of FIG. 4 is provided to generate the tree structure association based on the margins and selected unions. For example, using the unions and margins of the example of FIG. 2, the association controller 402 tags each margin and union with (i) a number, an index value, or other identifier and (ii) with corresponding ancestors and/or descendants. For example, the association controller 402 tags the AB union (e.g., a node of the tree structure association 300 of FIG. 3) with a node index value (e.g., "4" for node 4 in FIG. 3) and tags the AB node/union as having a parent union of ABC (e.g., node 5 in FIG. 3) and children margins A and B (e.g., nodes 1 and 2 in FIG. 3). The association controller 402 stores the tags in conjunction with the total audience sizes in the example local memory 410. In this manner, the commercial solver(s) 408 can solve a system of equations using the tagged margin and/or union total audience sizes stored in the example local memory 410. In examples disclosed herein, the association controller 402 may implement example means for controlling.

The example probability manager 404 of FIG. 4 is provided to determine and/or otherwise identify estimated probabilities associated with each margin and/or union in the tree structure association 300. Initially, the example probability manager 404 identifies current estimates of the Lagrange multipliers. For example, the probability manager 404 is configured to determine the current state of the Lagrange multipliers. After the example probability manager 404 identifies the current estimates of the Lagrange multipliers, the probability manager 404 computes estimated probabilities associated with each margin(s) and/or union(s) of media. In this manner, the example probability manager 404 stores the estimated probabilities associated with each margin(s) and/or union(s) of media in the local memory 410. In examples disclosed herein, the probability manager 404 may implement example means for managing.

The example matrix generator 406 of FIG. 4 is provided to determine a matrix (e.g., a Jacobian matrix) based on the estimated probabilities determined by the probability manager 404. The example matrix generator 406 may store the matrix (e.g., the Jacobian matrix) in the local memory 410 for use by the commercial solver(s) 408. In some examples, the matrix generator 406 is configured to determine, analyze, update, store, and/or otherwise calculate each element in the matrix (e.g., the Jacobian matrix). In examples disclosed herein, the matrix (e.g., Jacobian matrix) is a m×m matrix in which the variable m represents a number of nodes equivalent to a sum of (1) the number of nodes in a tree structure association (e.g., the number of margin(s) and/or union(s) in the tree structure association 300 of FIG. 3) and (2) an additional node corresponding to the UE. For example, the tree structure association 300 of FIG. 3 includes three margins (e.g., nodes A, B, and C) and two unions (e.g., nodes AB and ABC) and, thus, the corresponding matrix is a six-by-six matrix. In examples disclosed herein, the probability matrix generator 406 may implement example means for generating.

Accordingly, the example matrix generator 406 is configured to traverse through all possible combinations of margins and/or unions when generating the matrix (e.g., the Jacobian matrix). The example matrix generator 406 is configured to analyze each element of the matrix (e.g., the Jacobian matrix) individually to identify example index values associated with each element. For example, each element in the matrix (e.g., the Jacobian matrix) is associated with a jth and kth index value (e.g., a jth index value to identify a row and a kth index value to identify a column). Accordingly, when an element is a diagonal element in the matrix (e.g., when the jth and kth index values are equivalent), the matrix generator 406 stores a value in the element equivalent to the sum of probabilities associated with the node having the same index value as the element. For example, if the element being analyzed corresponds to position (1,1) (e.g., the jth index value is 1 and the kth index value is 1) of the matrix, then the element is a diagonal and, thus, the matrix generator 406 stores a value in the element that is equivalent to the sum of probabilities associated with the margin and/or union having the same index value. The example matrix generator 406 may execute Equations 15-18 below for elements that are diagonal elements.

$$J_{jk} = \Sigma_{i=1}^{n}(c_{ji}c_{ki})p_i \qquad \text{Equation 15}$$

$$J_{jk} = \Sigma_{i=1}^{n}(c_{ji})^2 p_i \qquad \text{Equation 16}$$

$$J_{jk} = \Sigma_{i=1}^{n} c_{ji} p_i \qquad \text{Equation 17}$$

$$J_{jk} = f_j \qquad \text{Equation 18}$$

Since Equations 15-18 above are used to analyze diagonal elements, the index values j and k are equivalent. Accordingly, the matrix, J, at the element defined by the index value (j,k) (e.g., (j,j), or (k,k)) can be identified as being the current sum of probabilities associated with the jth margin and/or union. For example, the element (1,1) of the matrix (e.g., the Jacobian matrix) can be identified by the matrix generator 406 as being equivalent to the sum of probabilities associated with the node having an index value of 1 (e.g., node A of FIG. 3).

Additionally, in examples disclosed herein, when the jth index value of the element is associated with a node that is a descendant of a node associated with the kth index value, the matrix generator 406 stores a value in the element equivalent to the sum of probabilities associated with the node having the same index value as the jth index value. For example, if the element being analyzed corresponds to position (2,4) of the matrix, and the node having an index value of two is a descendant of the node having an index value of four, then the matrix generator 406 may store a value in the element equivalent to the sum of probabilities associated with the node having an index value of two. The example matrix generator 406 may execute Equations 19-21 below when the jth index value of the element corresponds to a node that is a descendant of a node associated with the kth index value.

$$J_{jk} = \Sigma_{i=1}^{n}(c_{ji}c_{ki})p_i \qquad \text{Equation 19}$$

$$J_{jk} = \Sigma_{i=1}^{n} c_{ji} p_i \qquad \text{Equation 20}$$

$$J_{jk} = f_j \qquad \text{Equation 21}$$

In Equations 19-21 above, since the jth index value of the element corresponds to a node that is a descendant of a node associated with the kth index value, the node associated with the kth index value includes all audience members of the jth index value. Accordingly, the matrix, J, at element (j,k) can be identified as being the current sum of probabilities associated with the jth node. For example, the element (2,4) of the matrix (e.g., the Jacobian matrix) can be identified by the matrix generator 406 as being equivalent to the sum of probabilities associated with the second node (e.g., node B of FIG. 3).

Additionally, in examples disclosed herein, when the jth index value of the element is not associated with a node that is a descendant of a node associated with the kth index value, and the element is not a diagonal element, the matrix generator 406 stores a value in the element equivalent to a quotient of: (A) (i) the sum of probabilities associated with the node having the jth index value multiplied by (ii) the sum of probabilities associated with the node having the kth index value, and (B) a second sum of probabilities associated with a node being an ancestor of the nodes associated with the jth and kth index values. The example matrix generator 406 may execute Equations 22-24 below when the jth index value of the element is not indicative of a descendant of the kth index value and the element is not a diagonal element.

$$J_{jk} = \Sigma_{i=1}^{n}(c_{ji}c_{ki})p_i \qquad \text{Equation 22}$$

$$J_{jk} = f_{j \wedge k} \qquad \text{Equation 23}$$

$$J_{jk} = f_j + f_k - f_{j \vee k} \qquad \text{Equation 24}$$

In Equations 22-24 above, determining the sum of probabilities associated with the node corresponding to jth index or the node corresponding to the kth index may be computationally intensive. Accordingly, the example matrix generator 406 may alternatively execute Equations 25-32 below when the jth index value of the element is not indicative of a descendant of the kth index value and the element is not a diagonal element.

$$J_{jk} = \sum_{i=1}^{n}(c_{ji}c_{ki})p_i \qquad \text{Equation 25}$$

$$J_{jk} = f_{j \wedge k} \qquad \text{Equation 26}$$

$$J_{jk} = \frac{f_{j \wedge k}}{f_0}(f_0) \qquad \text{Equation 27}$$

$$J_{jk} = Pr(j \wedge k)(f_0) \qquad \text{Equation 28}$$

$$J_{jk} = Pr(j \wedge k \mid r)Pr(r)(f_0) \qquad \text{Equation 29}$$

$$J_{jk} = Pr(j \mid r)Pr(k \mid r)Pr(r)(f_0) \qquad \text{Equation 30}$$

$$J_{jk} = \left(\frac{f_j}{f_r}\right)\left(\frac{f_k}{f_r}\right)\left(\frac{f_r}{f_0}\right)f_0 \qquad \text{Equation 31}$$

$$J_{jk} = \frac{f_j f_k}{f_r} \qquad \text{Equation 32}$$

In examples disclosed herein, the matrix generator 406 traverses through each element in the matrix. The example matrix generator 406 determines whether the jth and kth index values are indicative of: (1) a diagonal entry, (2) a descendant entry, or (3) neither a diagonal entry nor a descendent entry. The matrix generator 406 may execute Equations 15-18 when the element is a diagonal entry (e.g., the jth and kth index values are equivalent). The example matrix generator 406 may execute Equations 19-21 when the element is a descendent entry (e.g., jth index value of the element corresponds to a node that is a descendant of the node associated with the kth index value). The matrix generator 406 may execute Equations 22-24 or 25-32 when the element is neither a diagonal entry nor a descendent entry. Once fully traversed, the matrix generator 406 provides the matrix (e.g., the Jacobain matrix) to the local memory 410.

The example commercial solver(s) 408 of FIG. 4 may be implemented using optimization software packet(s) that solve(s) one or more system(s) of equations using the tagged margin and/or union total audience sizes stored in the example local memory 410 to estimate the total deduplicated audience sizes for margin and/or union total audience sizes. For example, the commercial solver(s) 408 may be a CPLEX optimizer, a GNU linear programming kit (GLPK), a Gurobi Optimizer, a solving constraint integer program, and/or any type of mixed integer programming optimizer. In some examples, the commercial solver(s) 408 may be implemented by an arithmetic logic unit (ALU). In examples disclosed herein, the commercial solver(s) 408 may execute control based on Equations 1-8 to estimate the total deduplicated audience sizes for margin and/or union total audience sizes. In examples disclosed herein, the commercial solver(s) 408 may implement example means for determining a deduplicated audience size. Additionally or alternatively, the commercial solver(s) 408 may implement example means for determining an audience size. Additionally or alternatively, the commercial solver(s) 408 may implement example means for estimating deduplicated audience sizes. In examples disclosed herein, the local memory 410 may implement example means for storing.

While an example manner of implementing the audience size determiner 120 of FIG. 1 is illustrated in FIG. 4, one or more of the elements, processes and/or devices illustrated in FIG. 4 may be combined, divided, re-arranged, omitted, eliminated and/or implemented in any other way. Further, the example interface(s) 400, the example association controller 402, the example probability manager 404, the example matrix generator 406, the example commercial solver(s) 408, the example local memory 410, and/or, more generally, the example audience size determiner 120 of FIG. 4 may be implemented by hardware, software, firmware and/or any combination of hardware, software and/or firmware. Thus, for example, any of the example interface(s) 400, the example association controller 402, the example probability manager 404, the example matrix generator 406, the example commercial solver(s) 408, the example local memory 410, and/or, more generally, the example audience size determiner 120 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example interface(s) 400, the example association controller 402, the example probability manager 404, the example matrix generator 406, the example commercial solver(s) 408, and/or the example local memory 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience size determiner 120 of FIGS. 1 and/or 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
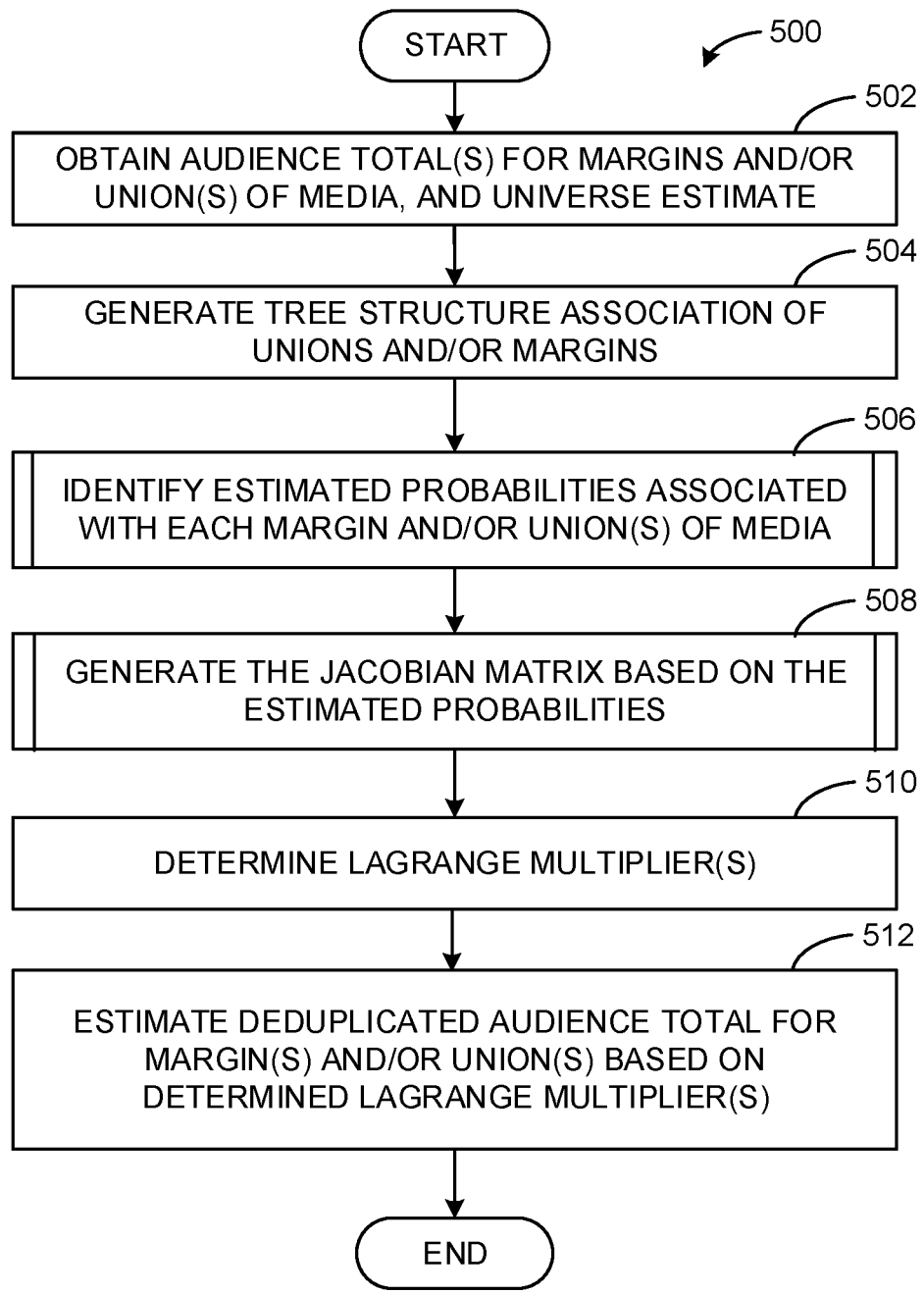
FIG. 5 is a flowchart representative of example machine readable instructions that may be executed by a processor to implement the example audience size determiner of FIGS. 1 and/or 4 to estimate deduplicated audience sizes for margin(s) and/or union(s).
Figure 6:
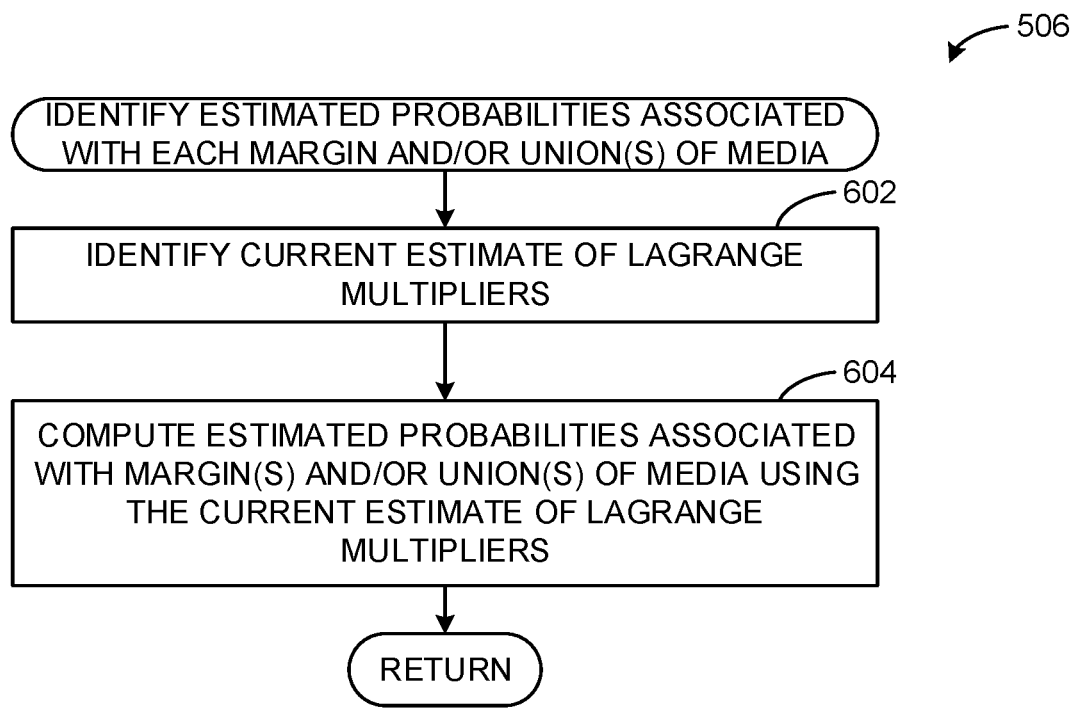
FIG. 6 is a flowchart representative of example machine readable instructions that may be executed by a processor to implement the example audience size determiner of FIGS. 1 and/or 4 to identify estimated probabilities associated with margin(s) and/or union(s) of media.

Flowchart representative of example hardware logic, machine readable instructions, hardware implemented state machines, and/or any combination thereof for implementing the audience size determiner 120 of FIGS. 1 and/or 4 are shown in FIGS. 5, 6, and/or 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5, 6, and/or 7, many other methods of implementing the example audience size determiner 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5, 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart 500 representative of example machine readable instructions that may be executed by a processor to implement the example audience size determiner 120 of FIGS. 1 and/or 4 to estimate deduplicated audience sizes for margin(s) and/or union(s). The example flowchart 500 is described in conjunction with the example marginal and union total audience size data 200 of FIG. 2. However, the example flowchart 500 may be implemented in conjunction with any panelist data, census data, margins, and/or unions.

At block 502, the example interface(s) 400 (FIG. 4) obtains total audience sizes for margins and/or union(s) of media, and a universe estimate. As described above, the total audience sizes may correspond to panelist total audience size, RPD total audience sizes, and/or any other kind of total audience sizes for margins and/or union(s) of media. Using the example of FIG. 2, the interface(s) 400 obtain(s) the marginal and union total audience size data 200 corresponding to particular media (e.g., a first television show, a second television show, and a third television show) at margins A, B, and E and at unions AB and ABC. Additionally, using the example of FIG. 2, the interface(s) 400 obtain(s) the UE from RPD audience data storage 116 based on the return path data 100.

At block 504, the example association controller 402 (FIG. 4) generates a tree structure association of the unions and margins. As described above in conjunction with FIG. 4, the example association controller 402 generates a tree structure association (e.g., the tree structure association 300 of FIG. 3) by tagging the margins and unions with index values and/or identifiers and tagging each node with corresponding ancestor and/or descendant information. The tree structure association information is stored in the example local memory 410. The example tree structure association 300 of FIG. 3 illustrates an example tree structure corresponding to the marginal and union total audience size data 200 of FIG. 2.

At block 506, the example probability manager 404 (FIG. 4) identifies estimated probabilities associated with each margin(s) and/or union(s) of media. Using the example of FIG. 2, the probability manager 404 obtain(s) the marginal and union total audience size data 200 corresponding to particular media (e.g., a first television show, a second television show, and a third television show) at margins A, B, and E and at unions AB and ABC to determine an estimated probability of audience size associated with each margin and/or union. Example machine readable instructions that may be executed to implement block 506 are described below in connection with FIG. 6.

At block 508, the example matrix generator 406 (FIG. 4) generates and/or otherwise determines a matrix (e.g., the Jacobian matrix) based on the estimated probabilities. For example, responsive to the probability manager 404 identifying estimated probabilities associated with each margin(s) and/or union(s) of media, the matrix generator 406 determines the elements in the matrix (e.g., the Jacobian matrix). Example machine readable instructions that may be executed to implement block 508 are described below in connection with FIG. 6.

At block 510, the example commercial solver(s) 408 determines(s) Lagrange multipliers λs. For example, the commercial solver(s) 408 solve(s) for (e.g., determines) the Lagrange multipliers using Equations 8 based on the panelist data (obtained at block 502), the tree structure association data (generated at block 504), and the matrix (e.g., the Jacobian matrix) (generated at block 508) stored in the local memory 410 (FIG. 4).

At block 512, the example commercial solver(s) 408 (FIG. 4) estimate the deduplicated audience total for the one or more of the margins and/or unions (e.g., A, B, C, AB, ABC) based on the determined Lagrange multipliers λs determined at block 510. The example instructions of FIG. 4 end.

FIG. 6 is an example flowchart 506 representative of example machine readable instructions that may be executed by a processor to implement the example audience size determiner 120 of FIGS. 1 and/or 4 to identify estimated probabilities associated with each margin(s) and/or union(s) of margin. In the illustrated example, the estimated probabilities represent a probability associated with a likelihood that an audience member accessed and/or otherwise was exposed to a margin and/or union of margins. The instructions of FIG. 6 may be used to implement block 506 of FIG. 5. The example flowchart 506 is described in conjunction with the example marginal and union total audience size data 200 of FIG. 2. However, the example flowchart 506 may be implemented in conjunction with any panelist data, census data, margins, and/or unions.

At block 602, the example probability manager 404 identifies the current estimate of the Lagrange multipliers. For example, initially the Lagrange multipliers may be zero. However, after an initial iteration (e.g., executing Equations 1-8), the probability manager 404 may determine non-zero values for the estimated Lagrange multipliers.

At block 604, the example probability manager 404 utilizes the estimated Lagrange multipliers to compute estimated probabilities associated with the margin(s) and/or union(s) of media. For example, the probability manager 404 may determine an estimated probability for each node in the tree structure association 300 (FIG. 3) (e.g., margins A, B, and/or C, and/or unions AB, and/or ABC). The example instructions of FIG. 6 then end and control returns to block 508 of FIG. 5.

Figure 7:
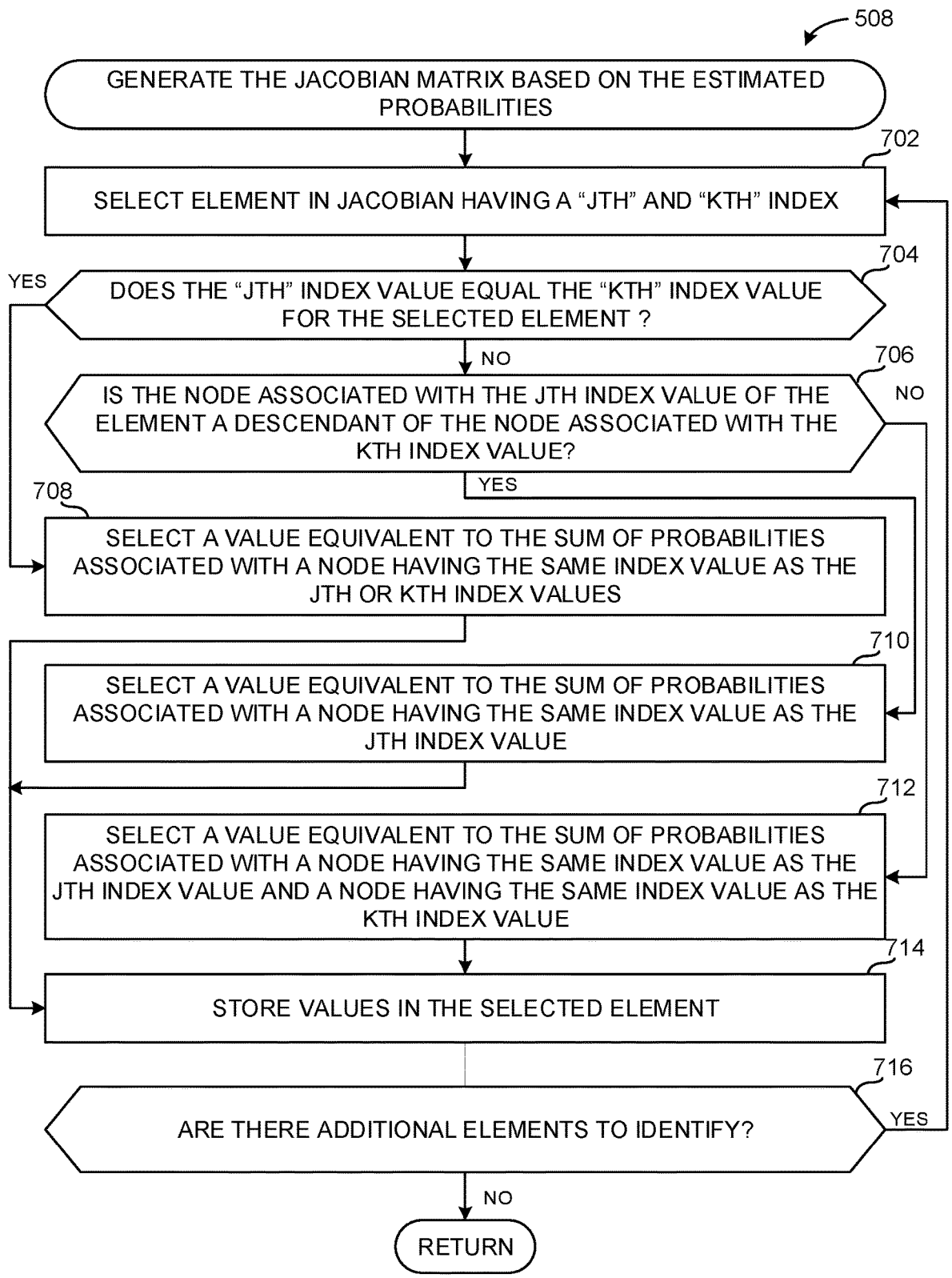
FIG. 7 is a flowchart representative of example machine readable instructions that may be executed by a processor to implement the example audience size determiner of FIGS. 1 and/or 4 to generate a matrix to estimate deduplicated audience sizes.

FIG. 7 is an example flowchart 508 representative of example machine readable instructions that may be executed by a processor to implement the example audience size determiner 120 of FIGS. 1 and/or 4 to generate a matrix (e.g., the Jacobian matrix) based on estimated probabilities. The example instructions of FIG. 7 may be used to implement block 508 of FIG. 5. The example flowchart 508 is described in conjunction with the example marginal and union total audience size data 200 of FIG. 2. However, the example flowchart 508 may be described in conjunction with any panelist data, census data, margins, and/or unions.

At block 702, the matrix generator 406 (FIG. 4) selects an element of the matrix (e.g., the Jacobian matrix) having example jth and kth index values. For example, each element in the matrix (e.g., the Jacobian matrix) is associated with a unique combination of jth and kth index values. Such an element is selected by the matrix generator 406.

At block 704, the matrix generator 406 determines whether the jth index value equals the kth index value for the selected element. For example, the matrix generator 406 performs this comparison of the jth and kth index values to determine whether the element to be analyzed is a diagonal element in the matrix (e.g., the Jacobian matrix). In response to the matrix generator 406 determining the jth and kth index values are equivalent (e.g., the control of block 704 returns a result of YES), control proceeds to block 708. The control of block 708 is explained below. Alternatively, in response to the matrix generator 406 determining the jth index values does not equal the kth index value (e.g., the control of block 704 returns a result of NO), control proceeds to block 706 in which the matrix generator 406 determines whether the node associated with the jth index value of the element is a descendant of the node associated with the kth index value. As used herein, an element refers to an element in the matrix (e.g., the Jacobian Matrix) associated with jth and kth index values. Furthermore, a node corresponds to a node in a tree structure association (e.g., the tree structure association 300 of FIG. 3) associated with a corresponding index value. Thus, an element having jth and kth index values (e.g., the element (1,2) in a Jacobian matrix) is associated with nodes in the tree structure association having index values equivalent to the jth and kth index values (e.g., a first node having an index value of 1 and a second node having an index value of 2).

In response to the matrix generator 406 determining the node associated with the jth index value of the element is a descendant of the node associated with the kth index value (e.g., the control of block 706 returns a result of YES), control proceeds to block 710. Alternatively, in response to the matrix generator 406 determining the node associated with the jth index value of the element is not a descendant of the node associated with the kth index value (e.g., the control of block 706 returns a result of NO), control proceeds to block 712. The control of blocks 710 and 712 are explained below.

At block 708, the matrix generator 406 selects a value equivalent to the sum of probabilities associated with a node having the same index value as the jth or kth index values. For example, if the jth index value is one, the matrix generator 406 may identify the estimated sum of probabilities associated with the node having an index value of one (e.g., node A). Accordingly, the sum of probabilities associated with the node having an index value of one may be stored in the element. Furthermore, the matrix generator 406 may execute Equations 15-18, above, to select a value equivalent to the sum of probabilities associated with a node having the same index value as the jth or kth index values. Control proceeds to block 714 responsive to execution of the control illustrated in block 708.

At block 710, the matrix generator 406 selects a value equivalent to the sum of probabilities associated with a node having the same index value as the jth index value. For example, if the jth index value is one, the matrix generator 406 may identify the estimated sum of probabilities associated with the node having an index value of one (e.g., margin A). Accordingly, the sum of probabilities associated with the node having an index value of one may be stored in the element. Furthermore, the matrix generator 406 may execute Equations 19-21, above, to select a value equivalent to the sum of probabilities associated with a node having the same index value as the jth index value. Control proceeds to block 714 responsive to execution of the control illustrated in block 710.

At block 712, the matrix generator 406 selects a value equivalent to the sum of probabilities associated with a node having the same index value as the jth index value and a node having the same index value as the kth index value. For example, the matrix generator 406 may store a value equivalent to a sum of: (1) probabilities associated with a node having the same index value as the jth index value and (2) probabilities associated with a node having the same index value as the kth index value. Furthermore, the matrix generator 406 may execute Equations 22-24 or Equations 25-32 above to select a value equivalent to the sum of probabilities associated with a node having the same index value as the jth index value and a node having the same index value as the kth index value. Control proceeds to block 714 responsive to execution of the control illustrated in block 708.

At block 714, the matrix generator 406 stores the value in the selected element. Responsive to the execution of the control executed in block 714, control proceeds to block 716.

At block 716, the matrix generator 406 determines whether there are additional elements to identify. In response to the matrix generator 406 determining there are additional elements to identify (e.g., the control of block 716 returns a result of YES), control returns to block 702. Alternatively, in response to the matrix generator 406 determining there are not additional elements to identify (e.g., the control of block 716 returns a result of NO), the instructions of FIG. 7 end and control returns to block 510 of FIG. 5.

Figure 8:
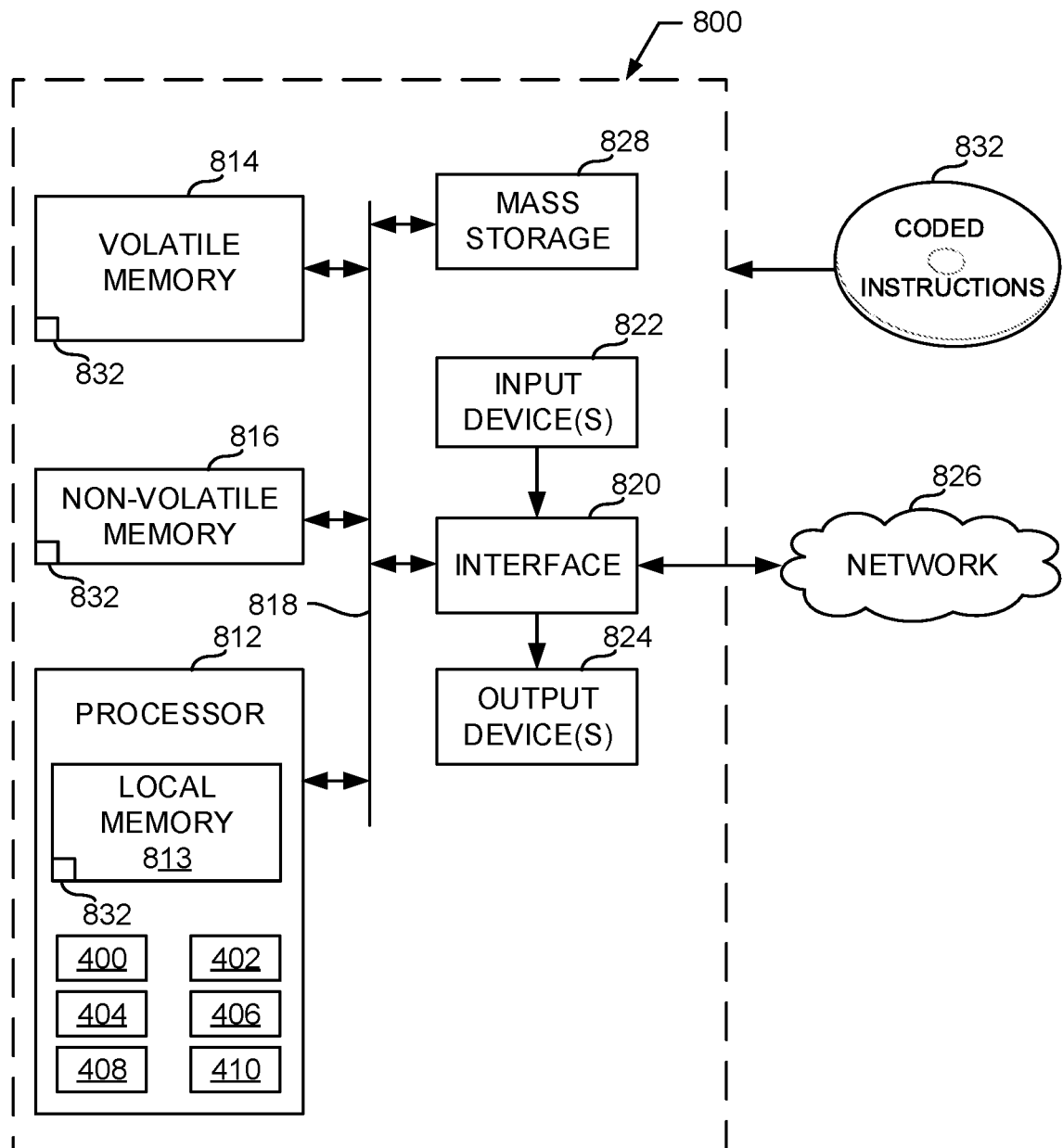
FIG. 8 is a block diagram of an example processor platform structured to execute the instructions of FIGS. 5, 6, and/or 7 to implement the audience size determiner of FIGS. 1 and/or 4 to estimate deduplicate audience sizes.

FIG. 8 is a block diagram of an example processor platform 800 structured to execute the instructions of FIGS. 5, 6, and/or 7 to implement the audience size determiner 120 of FIGS. 1 and/or 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface(s) 400, the example association controller 402, the example probability manager 404, the example matrix generator 406, the example commercial solver(s) 408, the example local memory 410, and/or, more generally, the example audience size determiner 120 of FIG. 4.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5, 6, and/or 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that estimate large scale audience deduplication. The disclosed methods, apparatus and articles of manufacture improve the efficiency of using a computing device by generating a matrix using a sum of probabilities obtained from a tree graph association or tree structure association for the margin(s) and union(s). In this manner, the matrix can be utilized to efficiently calculate one or more Lagrange multipliers. The disclosed methods, apparatus, and articles of manufacture generate the matrix using significantly less processing power than prior techniques, thereby improving the functioning of a computer. For example, rather than computing the matrix by solving a large number of partial derivative equations, examples disclosed herein utilize algebraic functions based on a sum of one or more probabilities associated with one or more nodes in a tree structure association. The disclosed methods, apparatus and articles of manufacture are accordingly directed to one or more improvement(s) in the functioning of a computer.

Example methods, apparatus, systems, and articles of manufacture to estimate large scale audience deduplication are disclosed herein. Further examples and combinations thereof include the following:

Example 1 includes an apparatus comprising an association controller to generate a tree structure association for a total audience size that accessed a plurality of media items, the tree structure association including a first node representative of a first media item accessed by first audience members of the total audience size and a second node representative of a second media item accessed by second audience members of the total audience size, a matrix generator to generate a matrix by selecting a sum of probabilities value corresponding to the tree structure association, the sum of probabilities value representative of a probability of the first audience members accessing the first media item, and storing the sum of probabilities value in an element of the matrix, and a commercial solver to estimate a deduplicated audience size of the total audience size using the matrix.

Example 2 includes the apparatus of example 1, wherein the first node includes a first index value, the second node includes a second index value, and the element includes a third index value and a fourth index value.

Example 3 includes the apparatus of example 2, wherein, when the third index value of the element equals the fourth index value of the element, the sum of probabilities value corresponds to the first node when the first index value of the first node equals the third index value of the element, and the second node when the second index value of the second node equals the fourth index value of the element.

Example 4 includes the apparatus of example 2, wherein the tree structure association further includes a union node representative of a union of the first node and the second node, the union node having a fifth index value, and when (1) the third index value of the element equals the fifth index value of the union, and (2) the fourth index value of the element equals the first index value of the first node, the sum of probabilities value corresponds to the first node.

Example 5 includes the apparatus of example 2, wherein, when the third index value of the element equals the first index value of the first node, the fourth index value of the element equals the second index value of the second node, the sum of probabilities value is equivalent to a quotient of a second sum of probabilities value of the first node multiplied by a third sum of probabilities value of the second node, and a fourth sum of probabilities value of an ancestor node of the first node and the second node.

Example 6 includes the apparatus of example 1, wherein the commercial solver is to determine Lagrange multipliers using the matrix.

Example 7 includes the apparatus of example 6, wherein the commercial solver is to use the Lagrange multipliers to solve a maximum entropy problem to estimate the deduplicated audience size.

Example 8 includes a non-transitory computer readable storage medium comprising instructions which, when executed, cause at least one processor to at least generate a tree structure association for a total audience size that accessed a plurality of media items, the tree structure association including a first node representative of a first media item accessed by first audience members of the total audience size and a second node representative of a second media item accessed by second audience members of the total audience size, generate a matrix by selecting a sum of probabilities value corresponding to the tree structure association, the sum of probabilities value representative of a probability of the first audience members accessing the first media item, and storing the sum of probabilities value in an element of the matrix, and determine a deduplicated audience size of the total audience size using the matrix.

Example 9 includes the computer readable storage medium of example 8, wherein the first node includes a first index value, the second node includes a second index value, and the element includes a third index value and a fourth index value.

Example 10 includes the computer readable storage medium of example 9, wherein the instructions, when executed, cause the at least one processor to, when the third index value of the element equals the fourth index value of the element, select the sum of probabilities value as corresponding to the first node when the first index value of the first node equals the third index value of the element, and the second node when the second index value of the second node equals the fourth index value of the element.

Example 11 includes the computer readable storage medium of example 9, wherein the instructions, when executed, cause the at least one processor to generate the structure association further including a union node representative of a union of the first node and the second node, the union node having a fifth index value, when (1) the third index value of the element equals the fifth index value of the union, and (2) the fourth index value of the element equals the first index value of the first node, select the sum of probabilities value as corresponding to the first node.

Example 12 includes the computer readable storage medium of example 9, wherein the instructions, when executed, cause the at least one processor to, when the third index value of the element equals the first index value of the first node and the fourth index value of the element equals the second index value of the second node, select the sum of probabilities value as equivalent to a quotient of a second sum of probabilities value of the first node multiplied by a third sum of probabilities value of the second node, and a fourth sum of probabilities value of an ancestor node of the first node and the second node.

Example 13 includes the computer readable storage medium of example 9, wherein the instructions, when executed, cause the at least one processor to determine Lagrange multipliers using the matrix.

Example 14 includes the computer readable storage medium of example 13, wherein the instructions, when executed, cause the at least one processor to use the Lagrange multipliers to solve a maximum entropy problem for use in determining the deduplicated audience size.

Example 15 includes a method comprising generating a tree structure association for a total audience size that accessed a plurality of media items, the tree structure association including a first node representative of a first media item accessed by first audience members of the total audience size and a second node representative of a second media item accessed by second audience members of the total audience size, generating a matrix by selecting a sum of probabilities value corresponding to the tree structure association, the sum of probabilities value representative of a probability of the first audience members accessing the first media item, and storing the sum of probabilities value in an element of the matrix, and determining a deduplicated audience size of the total audience size using the matrix.

Example 16 includes the method of example 15, wherein the first node includes a first index value, the second node includes a second index value, and the element includes a third index value and a fourth index value.

Example 17 includes the method of example 16, further including, when the third index value of the element equals the fourth index value of the element, selecting the sum of probabilities value as corresponding to the first node when the first index value of the first node equals the third index value of the element, and the second node when the second index value of the second node equals the fourth index value of the element.

Example 18 includes the method of example 16, further including generating the structure association further including a union node representative of a union of the first node and the second node, the union node having a fifth index value, when (1) the third index value of the element equals the fifth index value of the union, and (2) the fourth index value of the element equals the first index value of the first node, selecting the sum of probabilities value as corresponding to the first node.

Example 19 includes the method of example 16, further including, when the third index value of the element equals the first index value of the first node and the fourth index value of the element equals the second index value of the second node, selecting the sum of probabilities value as equivalent to a quotient of a second sum of probabilities value of the first node multiplied by a third sum of probabilities value of the second node, and a fourth sum of probabilities value of an ancestor node of the first node and the second node.

Example 20 includes the method of example 16, further including determining Lagrange multipliers using the matrix.

Example 21 includes the method of example 20, further including using the Lagrange multipliers to solve a maximum entropy problem for use in determining the deduplicated audience size.

Example 22 includes an apparatus comprising means for controlling to generate a tree structure association for a total audience size that accessed a plurality of media items, the tree structure association including a first node representative of a first media item accessed by first audience members of the total audience size and a second node representative of a second media item accessed by second audience members of the total audience size, means for generating a matrix to select a sum of probabilities value corresponding to the tree structure association, the sum of probabilities value representative of a probability of the first audience members accessing the first media item, and store the sum of probabilities value in an element of the matrix, and means for determining a deduplicated audience size of the total audience size using the matrix.

Example 23 includes the apparatus of example 22, wherein the first node includes a first index value, the second node includes a second index value, and the element includes a third index value and a fourth index value.

Example 24 includes the apparatus of example 23, wherein the means for generating is to, when the third index value of the element equals the fourth index value of the element, select the sum of probabilities value as corresponding to the first node when the first index value of the first node equals the third index value of the element, and the second node when the second index value of the second node equals the fourth index value of the element.

Example 25 includes the apparatus of example 23, wherein the means for controlling is to generate the structure association further including a union node representative of a union of the first node and the second node, the union node having a fifth index value, and wherein the means for generating is to when (1) the third index value of the element equals the fifth index value of the union, and (2) the fourth index value of the element equals the first index value of the first node, select the sum of probabilities value as corresponding to the first node.

Example 26 includes the apparatus of example 23, wherein the means for generating is to, when the third index value of the element equals the first index value of the first node and the fourth index value of the element equals the second index value of the second node, select the sum of probabilities value as equivalent to a quotient of a second sum of probabilities value of the first node multiplied by a third sum of probabilities value of the second node, and a fourth sum of probabilities value of an ancestor node of the first node and the second node.

Example 27 includes the apparatus of example 23, wherein the means for determining the estimated audience deduplication size is to determine Lagrange multipliers using the matrix.

Example 28 includes the apparatus of example 27, wherein the means for generating is to solve a maximum entropy problem for use in determining the deduplicated audience size.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry to collect, via a network, impression data indicative of accesses to a plurality of media items for a total audience size, the impression data including audience sizes for the plurality of media items, the total audience size including a computer-generated inaccuracy causing a misrepresentation of a deduplicated audience size of the plurality of media items;
   association controller circuitry to generate a tree structure association for the total audience size that accessed the plurality of media items, the tree structure association including a first node representative of a first media item accessed by first audience members of the total audience size and a second node representative of a second media item accessed by second audience members of the total audience size;
   matrix generator circuitry to improve functionality of a computer by generating a matrix without using processing power to solve a partial derivative equation for the first node or the second node, the matrix generator circuitry to generate the matrix by:
      selecting a sum of probabilities value corresponding to the tree structure association, the sum of probabilities value representative of a probability of the first audience members accessing the first media item; and
      storing the sum of probabilities value in an element of the matrix; and
   commercial solver circuitry to increase an accuracy of the computer to reduce the computer-generated inaccuracy of the total audience size by estimating the deduplicated audience size of the total audience size using the matrix.

2. The apparatus of claim 1, wherein the first node includes a first index value, the second node includes a second index value, and the element includes a third index value and a fourth index value.

3. The apparatus of claim 2, wherein, when the third index value of the element equals the fourth index value of the element, the sum of probabilities value corresponds to:
   the first node when the first index value of the first node equals the third index value of the element; and
   the second node when the second index value of the second node equals the fourth index value of the element.

4. The apparatus of claim 2, wherein the tree structure association further includes a union node representative of a union of the first node and the second node, the union node having a fifth index value, and when (1) the third index value of the element equals the fifth index value of the union, and (2) the fourth index value of the element equals the first index value of the first node, the sum of probabilities value corresponds to the first node.

5. The apparatus of claim 2, wherein, when the third index value of the element equals the first index value of the first node, the fourth index value of the element equals the second index value of the second node, the sum of probabilities value is equivalent to a quotient of:
   a second sum of probabilities value of the first node multiplied by a third sum of probabilities value of the second node; and
   a fourth sum of probabilities value of an ancestor node of the first node and the second node.

6. The apparatus of claim 1, wherein the commercial solver circuitry is to determine Lagrange multipliers using the matrix.

7. The apparatus of claim 6, wherein the commercial solver circuitry is to use the Lagrange multipliers to solve a maximum entropy problem to estimate the deduplicated audience size.

8. A non-transitory computer readable storage medium comprising instructions to cause programmable circuitry to at least:
   cause collection, via a network, of impression data indicative of accesses to a plurality of media items for a total audience size, the impression data including audience sizes for the plurality of media items, the total audience size including a processor-generated inaccuracy causing a misrepresentation of a deduplicated audience size of the plurality of media items;
   generate a tree structure association for the total audience size that accessed the plurality of media items, the tree structure association including a first node representative of a first media item accessed by first audience members of the total audience size and a second node representative of a second media item accessed by second audience members of the total audience size;
   generate a matrix without using processing power to solve a partial derivative equation for the first node or the second node by:
      selecting a sum of probabilities value corresponding to the tree structure association, the sum of probabilities value representative of a probability of the first audience members accessing the first media item; and
      storing the sum of probabilities value in an element of the matrix; and
   increase an accuracy of a computer by determining the deduplicated audience size of the total audience size using the matrix to reduce the processor-generated inaccuracy of the total audience size.

9. The computer readable storage medium of claim 8, wherein the first node includes a first index value, the second node includes a second index value, and the element includes a third index value and a fourth index value.

10. The computer readable storage medium of claim 9, wherein the instructions are to cause the programmable circuitry to, when the third index value of the element equals the fourth index value of the element, select the sum of probabilities value as corresponding to:
   the first node when the first index value of the first node equals the third index value of the element; and
   the second node when the second index value of the second node equals the fourth index value of the element.

11. The computer readable storage medium of claim 9, wherein the instructions are to cause the programmable circuitry to:
  generate the tree structure association to include a union node representative of a union of the first node and the second node, the union node having a fifth index value; and
  when (1) the third index value of the element equals the fifth index value of the union, and (2) the fourth index value of the element equals the first index value of the first node, select the sum of probabilities value as corresponding to the first node.

12. The computer readable storage medium of claim 9, wherein the instructions are to cause the programmable circuitry to, when the third index value of the element equals the first index value of the first node and the fourth index value of the element equals the second index value of the second node, select the sum of probabilities value as equivalent to a quotient of:
  a second sum of probabilities value of the first node multiplied by a third sum of probabilities value of the second node; and
  a fourth sum of probabilities value of an ancestor node of the first node and the second node.

13. The computer readable storage medium of claim 9, wherein the instructions are to cause the programmable circuitry to determine Lagrange multipliers using the matrix.

14. The computer readable storage medium of claim 13, wherein the instructions are to cause the programmable circuitry to use the Lagrange multipliers to solve a maximum entropy problem for use in determining the deduplicated audience size.

15. A method comprising:
  collecting, via a network, impression data indicative of accesses to a plurality of media items for a total audience size, the impression data including audience sizes for the plurality of media items, the total audience size including a computer-generated error causing a misrepresentation of a deduplicated audience size of the plurality of media items;
  generating, by executing an instruction with programmable circuitry, a tree structure association for the total audience size that accessed the plurality of media items, the tree structure association including a first node representative of a first media item accessed by first audience members of the total audience size and a second node representative of a second media item accessed by second audience members of the total audience size;
  improving functionality of a computer by generating, by executing an instruction with the programmable circuitry, a matrix without using processing power to solve a partial derivative equation for the first node or the second node by:
    selecting a sum of probabilities value corresponding to the tree structure association, the sum of probabilities value representative of a probability of the first audience members accessing the first media item; and
    storing the sum of probabilities value in an element of the matrix; and
  increasing an accuracy of the computer to reduce the computer-generated error of the total audience size by estimating the deduplicated audience size of the total audience size using the matrix.

16. The method of claim 15, wherein the first node includes a first index value, the second node includes a second index value, and the element includes a third index value and a fourth index value.

17. The method of claim 16, further including, when the third index value of the element equals the fourth index value of the element, selecting the sum of probabilities value as corresponding to:
  the first node when the first index value of the first node equals the third index value of the element; and
  the second node when the second index value of the second node equals the fourth index value of the element.

18. The method of claim 16, further including:
  generating the tree structure association to include a union node representative of a union of the first node and the second node, the union node having a fifth index value; and
  when (1) the third index value of the element equals the fifth index value of the union, and (2) the fourth index value of the element equals the first index value of the first node, selecting the sum of probabilities value as corresponding to the first node.

19. The method of claim 16, further including, when the third index value of the element equals the first index value of the first node and the fourth index value of the element equals the second index value of the second node, selecting the sum of probabilities value as equivalent to a quotient of:
  a second sum of probabilities value of the first node multiplied by a third sum of probabilities value of the second node; and
  a fourth sum of probabilities value of an ancestor node of the first node and the second node.

20. The method of claim 16, further including determining Lagrange multipliers using the matrix.

21. The method of claim 20, further including using the Lagrange multipliers to solve a maximum entropy problem for use in determining the deduplicated audience size.

22. A system comprising:
  memory;
  programmable circuitry; and
  instructions to cause the programmable circuitry to:
    cause collection, via a network, of impression data indicative of accesses to a plurality of media items for a total audience size, the impression data including audience sizes for the plurality of media items, the total audience size including a computer-generated inaccuracy causing a misrepresentation of a deduplicated audience size of the plurality of media items;
    generate a tree structure association for the total audience size that accessed the plurality of media items, the tree structure association including a first node representative of a first media item accessed by first audience members of the total audience size and a second node representative of a second media item accessed by second audience members of the total audience size;
    improve functionality of a computer by generating a matrix without using processing power to solve a partial derivative equation for the first node or the second node, the generating of the matrix by:
      selecting a sum of probabilities value corresponding to the tree structure association, the sum of probabilities value representative of a probability of the first audience members accessing the first media item; and
      storing the sum of probabilities value in an element of the matrix; and increase an accuracy of the computer to reduce the computer-generated inaccuracy of the total audience size by estimating the deduplicated audience size of the total audience size using the matrix.

23. The system of claim 22, wherein the first node includes a first index value, the second node includes a second index value, and the element includes a third index value and a fourth index value.

24. The system of claim 23, wherein when the third index value of the element equals the fourth index value of the element, the programmable circuitry is to select the sum of probabilities value as corresponding to:
the first node when the first index value of the first node equals the third index value of the element; and
the second node when the second index value of the second node equals the fourth index value of the element.

25. The system of claim 23, wherein the programmable circuitry is to:
generate the tree structure association to include a union node representative of a union of the first node and the second node, the union node having a fifth index value; and
when (1) the third index value of the element equals the fifth index value of the union, and (2) the fourth index value of the element equals the first index value of the first node, select the sum of probabilities value as corresponding to the first node.

26. The system of claim 23, wherein the programmable circuitry is to, when the third index value of the element equals the first index value of the first node and the fourth index value of the element equals the second index value of the second node, select the sum of probabilities value as equivalent to a quotient of:
a second sum of probabilities value of the first node multiplied by a third sum of probabilities value of the second node; and
a fourth sum of probabilities value of an ancestor node of the first node and the second node.

27. The system of claim 22, wherein the programmable circuitry is to determine Lagrange multipliers using the matrix.

28. The system of claim 27, wherein the programmable circuitry is to use the Lagrange multipliers to solve a maximum entropy problem for use in determining the deduplicated audience size.

* * * * *